United States Patent
Jung et al.

(10) Patent No.: US 12,462,033 B1
(45) Date of Patent: Nov. 4, 2025

(54) OPERATION METHOD OF ELECTRONIC APPARATUS FOR PERFORMING LARGE LANGUAGE MODEL BASED ANALYSIS INFERENCE FOR MALICIOUS SCRIPT ACTION

(71) Applicant: Ahnlab, Inc., Seongnam-si (KR)

(72) Inventors: Seonghoon Jung, Seoul (KR); Jueon Eom, Seoul (KR)

(73) Assignee: Ahnlab, Inc., Seongnam-si (KR)

( * ) Notice: Subject to any disclaimer, the term of this patent is extended or adjusted under 35 U.S.C. 154(b) by 0 days.

(21) Appl. No.: 19/268,956

(22) Filed: Jul. 14, 2025

(30) Foreign Application Priority Data

Aug. 6, 2024 (KR) ................. 10-2024-0104952

(51) Int. Cl.
G06F 21/56 (2013.01)
G06F 21/55 (2013.01)

(52) U.S. Cl.
CPC .......... G06F 21/566 (2013.01); G06F 21/552 (2013.01)

(58) Field of Classification Search
CPC ............... G06F 21/566; G06F 21/552
See application file for complete search history.

(56) References Cited

U.S. PATENT DOCUMENTS 10,621,343 B1 * 4/2020 Maciejak ............. G06F 21/562
11,977,633 B2 * 5/2024 Ulasen ................. G06F 21/562
12,204,644 B1 * 1/2025 Cocea ................. G06F 21/562
2008/0072214 A1 * 3/2008 Peyton ................. G06F 21/577 717/133
2012/0017117 A1 * 1/2012 Ghosh ................. G06F 11/3608 714/26
2013/0055208 A1 * 2/2013 Murthy ................ G06F 8/315 717/126
2015/0096025 A1 * 4/2015 Ismael ................. G06F 21/566 726/23

(Continued)

FOREIGN PATENT DOCUMENTS

JP 2023-97361 A 7/2023
KR 10-2011-0108491 A 10/2011
KR 10-2763464 B1 2/2025

OTHER PUBLICATIONS

Patsakis, Constantinos, Fran Casino, and Nikolaos Lykousas. "Assessing LLMs in malicious code deobfuscation of real-world malware campaigns." *Expert Systems with Applications* 256 (2024): 124912.

(Continued)

*Primary Examiner* — Darren B Schwartz
(74) *Attorney, Agent, or Firm* — NSIP Law

(57) ABSTRACT

An operation method of at least one electronic apparatus is disclosed. The operation method according to the present disclosure comprises acquiring static and dynamic analysis results corresponding to the results obtained by performing static and dynamic analyses performed on a plurality of scripts, each classified as benign or malicious, converting the static and dynamic analysis results of each of the plurality of scripts into text formatted to match the output format of at least one Large Language Model (LLM), training the LLM based on the converted text so that the LLM infers static and dynamic analysis results from an input script, and predicting static and dynamic analysis results for at least one target script based on the trained LLM.

6 Claims, 5 Drawing Sheets

(56) References Cited

U.S. PATENT DOCUMENTS

| | | | |
|---|---|---|---|
| 2017/0329582 A1* | 11/2017 | Steven | G06F 11/3604 |
| 2024/0054233 A1* | 2/2024 | Ohayon | G06F 21/577 |
| 2025/0061197 A1* | 2/2025 | Fujii | G06F 21/566 |
| 2025/0086270 A1* | 3/2025 | Palanki | G06F 21/577 |
| 2025/0111220 A1* | 4/2025 | Jones | G06N 3/08 |
| 2025/0173436 A1* | 5/2025 | Zhang | G06F 21/56 |

OTHER PUBLICATIONS

Lu, Haolang, et al. "Malsight: Exploring malicious source code and benign pseudocode for iterative binary malware summarization." *arXiv preprint arXiv:2406.18379* (2024).

Ding, Yangruibo, et al. "Traced: Execution-aware pre-training for source code." *Proceedings of the 46th IEEE/ACM International Conference on Software Engineering*. 2024.

Office Action issued on Oct. 25, 2024 to the Counterpart of KR 10-2024-0104952 (English 5 pages, Korean 5 pages).

Notice of Patent Allowance issued on Jan. 21, 2025 to the Counterpart of KR 10-2024-0104952 (English 3 pages, Korean 2 pages).

Hiroshi, Naito, "Study on Student Assistance Functions in a Comprehensive Programming Exercise System", Proceedings of the 67th National Conference, Information Processing Society of Japan, Mar. 2, 2005, (4 Pages in English, 6 Pages in Japanese).

Andriesse, Dennis, "Practical Binary Analysis: How to Build Linux Tools for Binary Instrumentation, Analysis, and Disassembly", First Edition, Dwango Co., Ltd., Jan. 29, 2022, (6 Pages in English, 28 Pages in Japanese).

Japanese Office Action Issued on Aug. 26, 2025, in Counterpart Japanese Patent Application No. 2025-125503 (4 Pages in English, 4 Pages in Japanese).

\* cited by examiner

OPERATION METHOD OF ELECTRONIC APPARATUS FOR PERFORMING LARGE LANGUAGE MODEL BASED ANALYSIS INFERENCE FOR MALICIOUS SCRIPT ACTION

CROSS-REFERENCE TO RELATED APPLICATION(S)

This application claims the benefit under 35 USC 119 (a) of Korean Patent Application No. 10-2024-0104952, filed with the Korean Intellectual Property Office on Aug. 6, 2024, the disclosure of which is incorporated herein by reference in its entirety.

BACKGROUND

Field

The present disclosure relates to an electronic apparatus or a system for providing a static/dynamic analysis result, and more particularly, to an operation method of an electronic apparatus or a system for inferring the results of static/dynamic analysis without actually performing the static/dynamic analysis.

Description of Related Art

In conventional script-based malicious behavior, actions are not typically carried out by a single script but often involve evasion techniques such as packing, obfuscation, or downloading additional scripts. For this reason, it is difficult to detect such behavior solely through static analysis at the source level. Therefore, detection of a threat due to script-based malicious behavior is typically based on the operation thereof, and dynamic analysis is performed in parallel to allow flexible response to packing and code obfuscation, enabling more accurate detection of malicious behavior.

However, the dynamic script analysis method also has two limitations.

First, dynamic analysis requires actually executing the script to observe the execution result, which requires a significant amount of time to analyze malicious behavior by directly running the script and reviewing the execution output. Particularly, if multiple dynamic and static analysis tools are used for in-depth analysis, more time will be required.

Second, since the script has actually to be executed, a dependency issue arises on the execution environment and timing. For example, even if a script performs malicious behavior, additional scripts may not be downloaded due to network blockage or server unavailability depending on the environment in which the analysis is conducted or as time elapses; this may lead to a different analysis result of malicious behavior, which makes the script not recognized as malicious; furthermore, if only part of the script is collected or a single unit of script is collected, malicious behavior may not be executed on its own, which may also make the script not recognized as malicious. Such dependencies introduce subjectivity into the determination process by an expert analyst, leading to a confused determination of malicious behavior (e.g., one analyst may conclude that the script is not malicious because it does not exhibit any malicious behavior, while another analyst may determine that the script performs malicious behavior after reviewing the overall behavior of the script).

SUMMARY

The present disclosure provides a system capable of inferring analysis results without using multiple static/dynamic analysis tools, aims to remove limitations such as delayed or hindered execution by minimizing the environment/time dependency required for dynamic analysis, and aims to reduce the time consumption due to other analysis tools by additionally inferring static suspicious patterns.

Technical objects of the present disclosure are not limited to those described above. Other technical objects and advantages of the present disclosure not mentioned above may be understood from the descriptions given below and more clearly understood by the embodiments of the present disclosure. Also, it should be easily understood that the technical objects and advantages of the present disclosure may be implemented by the means described in the appended claims and a combination thereof.

An operation method of at least one electronic apparatus according to one embodiment of the present disclosure comprises acquiring static and dynamic analysis results corresponding to the results obtained by performing static and dynamic analyses performed on a plurality of scripts, each classified as benign or malicious, converting the static and dynamic analysis results of each of the plurality of scripts into text formatted to match the output format of at least one Large Language Model (LLM), training the LLM based on the converted text so that the LLM infers static and dynamic analysis results from an input script, and predicting static and dynamic analysis results for at least one target script based on the trained LLM.

The acquiring of the static and dynamic analysis results may include extracting first data including execution lines, variable values, and variable types by performing debugging on each of the plurality of scripts, extracting second data including execution lines and symbolic expressions for conditional statements by performing symbolic execution on each of the plurality of scripts, and extracting third data including execution lines, calling function names, and parameters of the calling functions by performing function calling tracing on each of the plurality of scripts.

The converting into text formatted to match the output of the LLM may classify data extracted based on the execution order from the results of dynamic analysis corresponding to at least one of debugging, dynamic symbolic execution, or function calling tracing line by line.

The training of the LLM based on the converted text may train the LLM to separately infer dynamic analysis results for each of a plurality of dynamic analysis items, including at least one of debugging, dynamic symbolic execution, and function calling tracing.

The predicting of the static and dynamic analysis results may divide the target script into a plurality of lines for input into the trained LLM, identify at least one line corresponding to a suspicious pattern among the plurality of lines based on the output of the trained LLM, and predict dynamic analysis results corresponding to at least one of debugging, dynamic symbolic execution, and function calling tracing for each of the plurality of lines based on the output of the trained LLM.

Meanwhile, the operation method of the at least one electronic apparatus may comprise, if the data size of scripts collected in real-time per unit time within a system linked to the electronic apparatus exceeds a threshold capacity matching the computational speed of a dynamic analysis module of the system, dividing the scripts collected in real-time into a plurality of groups including a first group in which the data size of the constituent scripts is less than or equal to the threshold capacity and a second group excluding the first group, and predicting dynamic analysis results for each script included in the second group based on the trained LLM.

The key advantage of the operation method of the electronic apparatus according to the present disclosure is that it enables inference of dynamic analysis results regardless of constraints on time and environment, thereby providing analysts with a more efficient analysis environment. In other words, the present disclosure enables inferring static and dynamic analysis behaviors even based on partial scripts that may not be executed in practice, and particularly in the case of dynamic analysis, the behavior may be inferred without executing the script, thereby significantly reducing the time required for dynamic analysis.

DETAILED DESCRIPTION

Figure 1:
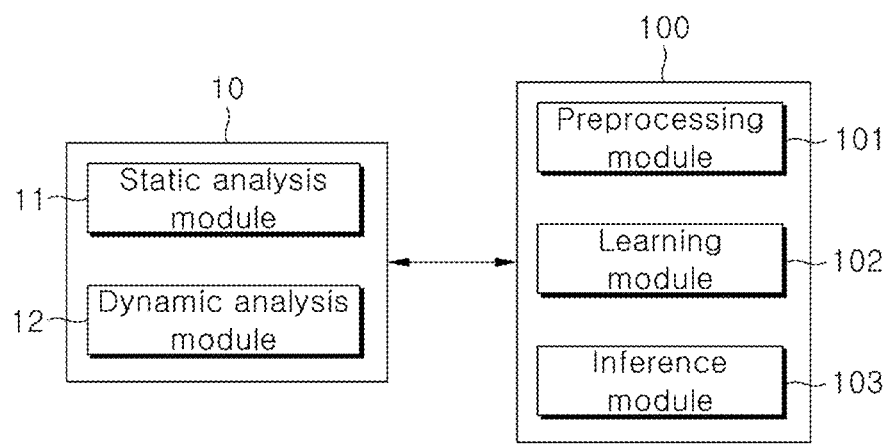
FIG. 1 is a block diagram illustrating the structure of an electronic apparatus according to one embodiment of the present disclosure.

Prior to a detailed description of the present disclosure, a description method employed in the present disclosure and appended drawings will be provided.

First, the terms used in the present disclosure and appended claims were selected from general terms in consideration of the functions of the present disclosure in various embodiments. However, these terms may vary depending on the intention of a person skilled in the art, legal or technical interpretations, or the emergence of new technologies. Additionally, some terms may have been arbitrarily selected by the applicant. These terms may be interpreted according to the definitions provided in the present disclosure; unless specifically defined, they may be interpreted based on the overall context of the present disclosure and common technical knowledge in the relevant technical field.

Also, the same reference numerals or symbols described in the accompanying in drawings of the present disclosure represent parts or constituting elements that perform substantially the same function. For the convenience of description and understanding, the same reference numerals or symbols are used across different embodiments. In other words, even if constituting elements with the same reference numeral are shown in a plurality of drawings, it does not indicate that the plurality of drawings represent the same embodiment.

Also, in the present disclosure and appended claims, ordinal terms such as "first", "second", and so on may be used to distinguish between constituting elements. These ordinals are used merely to differentiate similar constituting elements and should not be construed as limiting the meaning of the terms. For example, the use of the ordinals should not be understood as limiting the order of use or placement of the constituting elements associated therewith. If necessary, the ordinals may be used interchangeably.

In the present disclosure, singular expressions may include plural meanings unless the context clearly indicates otherwise. In the present disclosure, the term such as "include" or "comprise" is intended to specify the presence of features, numbers, steps, operations, constituting elements, parts, or combinations thereof but should not be interpreted as precluding the presence or addition of one or more other features, numbers, steps, operations, constituting elements, parts, or combinations thereof.

In the embodiments of the present disclosure, terms such as "module", "unit", or "part" refer to constituting elements that perform at least one function or operation, and the constituting elements may be implemented in hardware, software, or a combination of hardware and software. Moreover, unless specifically required to be implemented as separate hardware, a plurality of "modules", "units", or "parts" may be integrated into at least one module or chip and implemented by at least one processor.

Also, in the embodiments of the present disclosure, when a part is described as being connected to another part, it includes not only a direct connection but also indirect connections via other media. Furthermore, unless otherwise explicitly stated, if a particular element is said to include some particular element, it means that the former may further include other particular elements rather than exclude them.

FIG. 1 is a block diagram illustrating the structure of an electronic apparatus according to one embodiment of the present disclosure.

The electronic apparatus 100 may be implemented as an apparatus or a system comprising at least one computer configured to perform at least one of script collection, monitoring, and threat detection within a network related to various entities or groups such as individuals, enterprises, or organizations.

For example, the electronic apparatus 100 may be implemented as a server, a gateway, a firewall apparatus, or a routing apparatus, implemented as a POS system, a payment device, a vehicle terminal, a smart appliance, a desktop PC, a notebook PC, a smartphone, a tablet PC, or a console, or implemented as various other devices.

Referring to FIG. 1, the electronic apparatus 100 may communicate with an analysis system 10 for performing static and dynamic analysis. The analysis system 10 may include a static analysis module 11 for performing static analysis on at least one script and a dynamic analysis module 12 for performing dynamic analysis.

The electronic apparatus 100 may communicate with the analysis system 10 and receive the results of static and dynamic analysis performed by the analysis system 10, respectively. However, unlike FIG. 1, it is also possible for the static analysis module 11 and the dynamic analysis module 12 to be included in the electronic apparatus 100, respectively.

Referring to FIG. 1, the electronic apparatus 100 may include a preprocessing module 101, a learning module 102, and an inference module 103.

The preprocessing module 101 is configured to preprocess the static and dynamic analysis results to match the input format required by the Large Language Model (LLM).

The LLM is a model configured to infer the static and dynamic analysis results without actually performing static or dynamic analysis.

The preprocessing module 101 may convert the static and dynamic analysis results into text to match the output format of the LLM.

The learning module 102 is configured to train the LLM to infer the static and dynamic analysis results.

The learning module 102 may train the LLM using the static and dynamic analysis results, which have been preprocessed by the preprocessing module 101, as training data; at this time, the script to be analyzed may correspond to the input training data, and the preprocessed static and dynamic analysis results may correspond to the output training data.

The inference module 103 is configured to infer the static and dynamic analysis results, respectively. The inference module 103 may predict the static and dynamic analysis results for a target script without actually performing the static and/or dynamic analysis on the target script by inputting at least one target script into the trained LLM. At this time, a single target script or a plurality of target scripts may be input.

In what follows, the operation of the electronic apparatus 100 including the constituting elements will be described in more detail with reference to the appended drawings.

Figure 2:
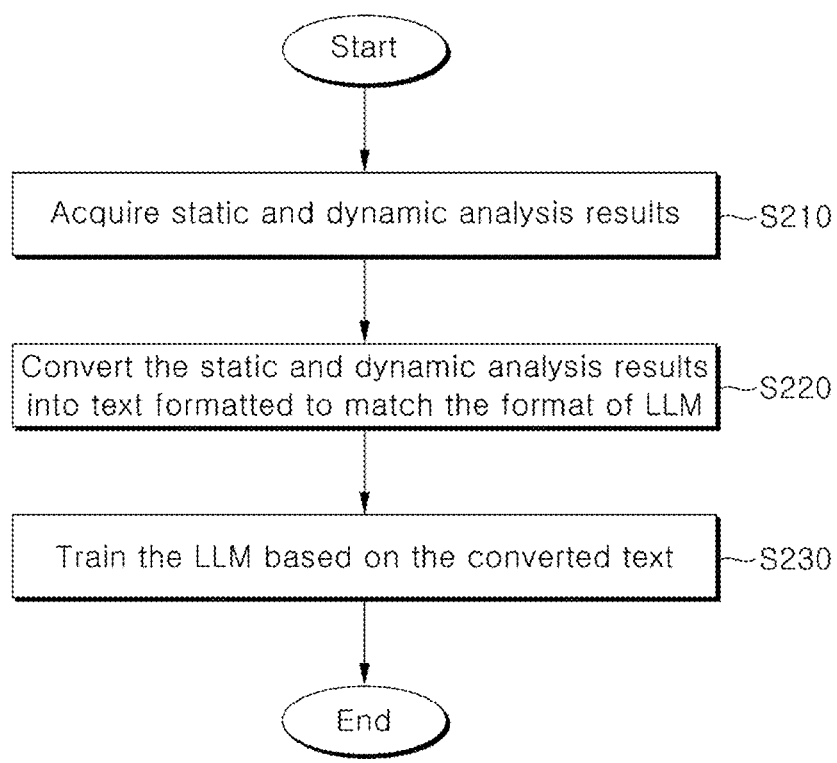
FIG. 2 is a flow diagram illustrating the operation of an electronic apparatus for training an LLM according to one embodiment of the present disclosure.

FIG. 2 is a flow diagram illustrating the operation of an electronic apparatus for training an LLM according to one embodiment of the present disclosure.

Referring to FIG. 2, the electronic apparatus 100 may obtain static and dynamic analysis results S210.

Specifically, the electronic apparatus 100 may acquire the results obtained by performing static and dynamic analysis on a plurality of scripts classified as either benign or malicious.

At this time, as the static and dynamic analyses are performed by the analysis system 10, data corresponding to the static and dynamic analysis results may be transmitted to the electronic apparatus 100.

Alternatively, as the static and/or dynamic analysis are performed by a static analysis module and a dynamic analysis module provided within the electronic apparatus 100, the static and dynamic analysis results may be acquired.

For example, in the case of static analysis, the electronic apparatus 100 may analyze a script to identify whether any suspicious pattern is present. To this end, at least one rule predefined for threat detection may be utilized, or at least one artificial intelligence model trained to detect patterns of malicious scripts may be employed.

For example, in the case of dynamic analysis, the electronic apparatus 100 may perform debugging, symbolic execution, and function calling tracing.

As a specific example, the electronic apparatus 100 may perform debugging on each of the plurality of scripts to extract first data including execution lines, variable values, and variable types by performing debugging on each of the plurality of scripts, second data including execution lines and symbolic expressions for conditional statements by performing symbolic execution on each of the plurality of scripts, and third data including execution lines, calling function names, and parameters of the calling functions by performing function calling tracing on each of the plurality of scripts.

If static and dynamic analysis results are obtained according to at least one of the embodiments above, the electronic apparatus 100 may convert the static and dynamic analysis results of each of the plurality of scripts into the text formatted to match the output format of the Large Language Model (LLM) through the preprocessing module 101 S220. At this time, the preprocessing module 101 may perform the preprocessing on each of the plurality of scripts corresponding to the input.

For the LLM to infer static and dynamic analysis results for a script, it is important to perform a preprocessing step that converts the input into a format suitable for model training. Accordingly, a task is devised to enable inference of static and dynamic analysis results based on script input.

Specifically, the LLM includes a tokenizing process that tokenizes sentences and receives and processes text such as sentences, phrases, and paragraphs as input.

To provide appropriate input to the LLM model, the preprocessing module 101 may perform basic preprocessing steps such as removing comments or reordering lines; additionally, the preprocessing module 101 may add special tokens such as <line> to enable the LLM model to recognize line information.

First, in the preprocessing of each script corresponding to the input of the LLM, the preprocessing module 101 may perform reformatting of each script and then classify the script based on <line> and <script> according to line-specific information.

Script Example

TABLE 1

| | |
|---|---|
| Line 1 | var a = "bWFsaWNpb3VzIGNvZGU="\\comment |
| Line 2 | if button.click( ): var result = atob(a); |
| Line 3 | document.write(result) \\comment2 |

Example of Reformatted Script

TABLE 2

| | |
|---|---|
| Line 1 | var a = "bWFsaWNpb3VzIGNvZGU=" |
| Line 2 | if button.click( ): |
| Line 3 | var result = atob(a); |
| Line 4 | document.write(result) |

Example of a Preprocessed Script

<line>1<script> var a="bWFsaWNpb3VzIGNvZGU="

<line>2<script> if button.click( )

<line>3<script> var result=atob(a);

<line>4<script> document.write(result)

In preprocessing the result data corresponding to the output of the LLM (i.e., static and dynamic analysis results), the preprocessing module 101 may define data related to the execution order of the result data and data to be extracted (state or type data) and may process the result data into a format that matches the output of the LLM.

Specifically, from the results of dynamic analysis corresponding to at least one of debugging, dynamic symbolic execution, and function calling tracing, the preprocessing module 101 may classify the data extracted based on the execution order line by line.

The following provides a preprocessing example for each dynamic analysis result.

Preprocessing Example of Debugging Result

```
<debugging>
<line>1<value>a:
   "bWFsaWNpb3VzIGNvZGU="<type>a: string
<line>2<value>a:
   "bWFsaWNpb3VzIGNvZGU="<type>a: string
<line>3<value>a:      "bWFsaWNpb3VzIGNvZGU=",
   result: "malicious code"<type>a: string, b: string
<line>4<value>a:      "bWFsaWNpb3VzIGNvZGU=",
   result: "malicious code"<type>a: string, b: string
</debugging>
```

According to the execution order performed on each script by the debugger, execution order data (line) and variable value, type, and so on may be extracted.

<Preprocessing example of dynamic symbolic execution result>

```
dynamic symbolic execution>
<line>2<condition>Any button.click ( )==True→execute
   lines 3 to 4
</dynamic symbolic execution>
```

Symbols related to conditional statements of branch statements (e.g., if-else or while) may be extracted.

<Preprocessing example of function calling tracing result>

```
<function calling>
<line>2<function call>click( )<parameter>None
<line>2<function call>execute click Internal function . . .
<line>2<function call>functional Exit
. . .
<line>3<function call>atob( )<parameter>a
<line>3<function call>base64 decoding process.
<line>3<function call>functional Exit
. . .
<line>4<function           call>document.
   write( )<parameter>result
<line>4<function call>write operation <parameter>result
<line>4<function call>functional Exit
</function calling>
```

Based on the call stack, order data (line) and a called function for function calling may be extracted. At this time, the call stack may be defined by an internal function call.

Specifically, the execution line, calling function name, and parameters are extracted, respectively.

As described above, once the static and dynamic analysis results are preprocessed and converted text is obtained, the learning module 102 may train the LLM based on the converted text S230.

Specifically, the learning module 102 may perform supervised learning so that, when the preprocessed input script is applied to the LLM, the designated static/dynamic analysis result is output. During training, a special token may be assigned for each static or dynamic analysis item (such as suspicious pattern extraction, debugging, dynamic symbolic execution, and function calling tracing) so that the LLM may be trained separately for each of analysis results.

Figure 3:
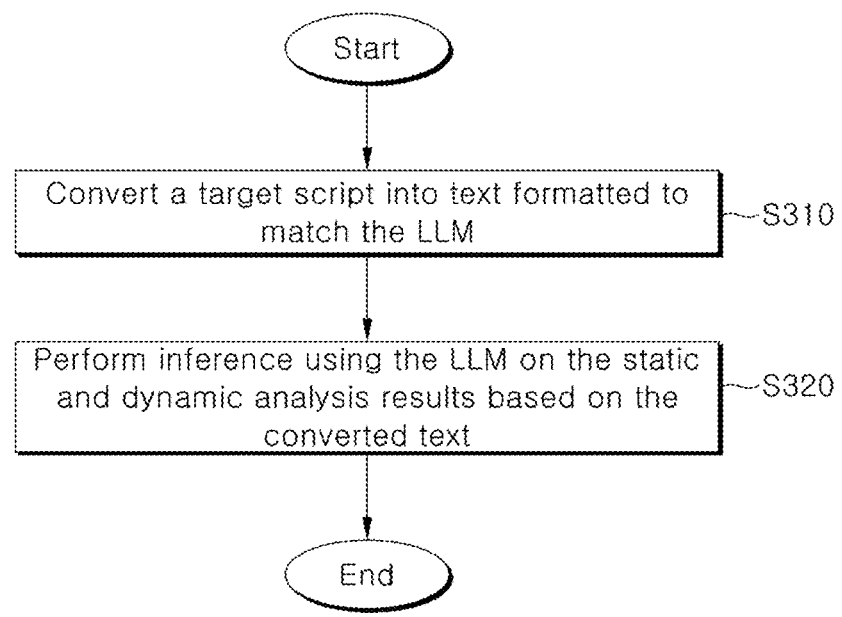
FIG. 3 is a flow diagram illustrating the operation of an electronic apparatus for inferring static and dynamic analysis results according to one embodiment of the present disclosure.

Meanwhile, FIG. 3 is a flow diagram illustrating the operation of an electronic apparatus for inferring static and dynamic analysis results according to one embodiment of the present disclosure. FIG. 3 assumes a situation in which the LLM has been trained for inference according to the embodiment illustrated in FIG. 2.

Referring to FIG. 3, the preprocessing module 101 may convert a target script, which is an inference target, into text formatted to match the LLM S310.

At this time, the preprocessing module 101 may divide the target script into a plurality of lines based on lines of the script to obtain the corresponding text.

Then, the inference module 103 may perform inference using the LLM on the static and dynamic analysis results based on the preprocessed target script S320.

For example, the inference module 103 may divide the target script into a plurality of lines and input them to the trained LLM and identify at least one line corresponding to a suspicious pattern among the plurality of lines based on the output of the trained LLM (inference for static analysis results). To this end, the LLM may be trained to analyze text or patterns within the script and detect suspicious patterns.

Also, for each of the plurality of lines, the inference module 103 may predict the result of dynamic analysis corresponding to at least one of debugging, dynamic symbolic execution, and function calling tracing, based on the output of the trained LLM.

Meanwhile, the electronic apparatus 100 according to one embodiment of the present disclosure may infer analysis results for only a portion of the target script, which is the target of analysis, depending on the capacity of the target script or the amount of data collected per unit time.

Specifically, it is assumed that the data size of target scripts collected in real-time per unit time within a system linked to the electronic apparatus 100 exceeds a threshold capacity corresponding to the processing speed of the dynamic analysis module of the system (e.g., the analysis system 10 or the electronic apparatus 100) that performs dynamic analysis. In this case, the electronic apparatus 100 may classify the target scripts collected in real-time into a plurality of groups, including a first group having a size not exceeding the threshold capacity and a second group excluding the first group.

Here, the electronic apparatus 100 may predict the dynamic analysis result for each script included in the second group based on the trained LLM. In other words, for the first group, actual dynamic analysis may be performed to derive dynamic analysis results, and for the second group, dynamic analysis results may be predicted through inference by the LLM.

At this time, the electronic apparatus 100 may record a first time taken to perform dynamic analysis on the first group through the dynamic analysis module, and a second time taken to predict the dynamic analysis results on the second group through inference by the LLM. The electronic apparatus 100 may update the threshold capacity by comparing the average values of the first and second times recorded for each unit time. At this time, the average value may be calculated by excluding the case in which the data size of the target scripts collected during a unit time is less than the threshold capacity and thus inference by the LLM is not performed at all.

For example, if the average value of the first time is greater than that of the second time, the threshold capacity may be decreased in proportion to the difference. Conversely, if the average value of the second time is greater than that of the first time, the threshold capacity may be increased in proportion to the difference.

In this manner, since the inference application range is automatically adjusted according to the capacity of the target scripts being analyzed, load of the electronic apparatus 100 or the system including the electronic apparatus 100 may be managed in a balanced way.

Figure 4A:
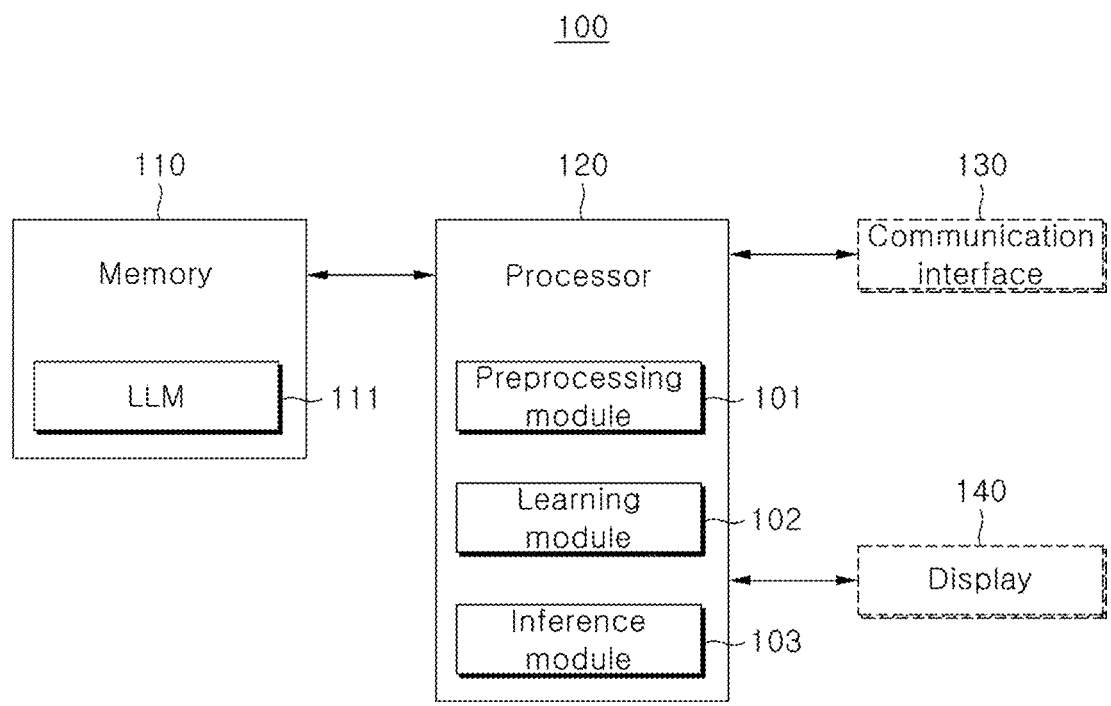
FIG. 4A is a block diagram illustrating the structure of an electronic apparatus including a built-in LLM according to one embodiment of the present disclosure.

Meanwhile, FIG. 4A is a block diagram illustrating the structure of an electronic apparatus including a built-in LLM according to one embodiment of the present disclosure.

Referring to FIG. 4A, the electronic apparatus 100 may include at least one memory 110 and at least one processor 120.

The memory 110 is configured to store an operating system (OS) for controlling the overall operation of the constituting elements of the electronic apparatus 100 and at least one instruction or data related to constituting elements of the electronic apparatus 100.

The memory 110 may include a non-volatile memory such as a ROM or a flash memory and include a volatile memory comprising a DRAM. Also, the memory 110 may include an auxiliary storage device such as a hard disk or a solid state drive (SSD).

Referring to FIG. 4A, at least one LLM 111 for inference may be included on the memory 110.

The processor 120 is configured to control the overall structure or operation.

The processor 120 may control the electronic apparatus 100 by being connected to the memory 110 and executing at least one instruction stored in the memory 110.

To this purpose, the processor 120 may be implemented as a general-purpose processor such as the Central Processing Unit (CPU) or Application Processor (AP), a graphics processor such as the Graphic Processing Unit (GPU) or Vision Processing Unit (VPU), and an artificial intelligence processor such as the Neural Processing Unit (NPU). The processor 120 may include a volatile memory such as the SRAM.

The processor 120 may control function-level modules such as the preprocessing module 101, the learning module 102, and the inference module 103. Each module corresponds to a constituting element implemented in software and/or hardware.

In addition to the memory 110 and the processor 120, the electronic apparatus 100 may further include a communication interface 130 and a display 140.

The communication interface 130 may be connected to an external electronic apparatus through one or more networks and may exchange data through a wired or wireless communication method.

The network may be a personal area network (PAN), a local area network (LAN), or a wide area network (WAN) depending on the application area or scale of the network; depending on the openness of the network, it may be implemented as intranet, extranet, or Internet.

The wireless communication may include at least one of communication methods such as Long-Term Evolution (LTE), LTE Advance (LTE-A), 5th Generation (5G) mobile communication, Code Division Multiple Access (CDMA), wideband CDMA (wCDMA), Universal Mobile Telecommunications System (UMTS), Wireless Broadband (WiBro), Global System for Mobile Communications (GSM), Time Division Multiple Access (TDMA), Wi-Fi (WiFi), WiFi Direct, Bluetooth, Near Field Communication (NFC), and Zigbee.

The wired communication may include at least one of communication methods such as Ethernet, optical network, Universal Serial Bus (USB), and ThunderBolt.

Meanwhile, the communication method is not limited to the examples above but may include communication methods emerging as the technology advances.

For example, the electronic apparatus 100 may collect scripts within a system/network via the communication interface 130. At this time, the electronic apparatus 100 may provide static and dynamic analysis results inferred by the LLM 111 to a terminal of a system/network administrator or user.

The display 140 is a constituting element for visually outputting various types of information and may include at least one display panel, a driving circuit, and the like.

The electronic apparatus 100 may visually output the inferred static and dynamic analysis results through the display 140.

Figure 4B:
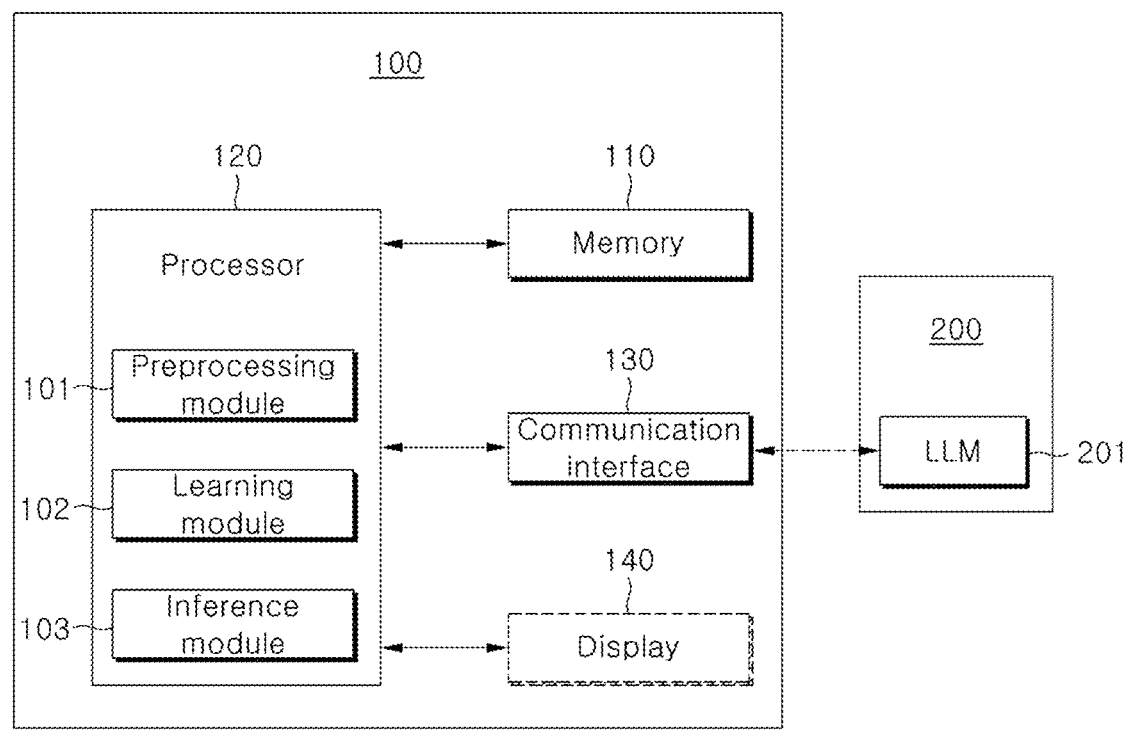
FIG. 4B is a block diagram illustrating the structure of an electronic apparatus utilizing an LLM of an external electronic apparatus according to one embodiment of the present disclosure.

Meanwhile, FIG. 4B is a block diagram illustrating the structure of an electronic apparatus utilizing an LLM of an external electronic apparatus according to one embodiment of the present disclosure.

Referring to FIG. 4B, the electronic apparatus 100 may include a memory 110, a processor 120, and a communication interface 130.

Referring to FIG. 4B, the electronic apparatus 100 may perform communication with an external electronic apparatus 200 via the communication interface 130 and utilize the LLM 201 included in the external electronic apparatus 200.

Also, the electronic apparatus 100 may collect scripts within a system/network through the communication interface 130 and provide the static and dynamic analysis results inferred by the LLM 201 to a terminal of a system/network administrator or user.

Also, the electronic apparatus 100 may output the inferred static and dynamic analysis results through the display 140.

Meanwhile, although not shown in FIG. 4A or FIG. 4B, the preprocessing module 101, learning module 102, and inference module 103 may be distributed across two or more electronic apparatus connected to each other. For example, a first electronic apparatus may include a first preprocessing module and the learning module 102 for handling of training data, and a second electronic apparatus may include a second preprocessing module and the inference module 103 for handling inference target data.

Meanwhile, as long as there is no conflict or contradiction, two or more of the various embodiments described above may be combined and implemented together.

Meanwhile, the various embodiments described above may be implemented in a recording medium readable by a computer or similar device using software, hardware, or a combination thereof.

In a hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing functions.

In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, computer instructions or computer programs for performing the processing operations in the electronic apparatus 100 according to the various embodiments of the present disclosure may be stored in a non-transitory computer-readable medium. When executed by a processor of a specific device, the computer instructions or computer programs stored in the non-transitory computer-readable medium cause the specific device to perform the processing operations in the electronic apparatus 100 according to the various embodiments described above.

The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

DETAILED DESCRIPTION OF MAIN ELEMENTS

10: Static/dynamic analysis system
100: Electronic apparatus
101: Preprocessing module
102: Learning module
103: Inference module
110: Memory
120: Processor
130: Communication interface
140: Display

What is claimed is:

1. An operation method of at least one electronic apparatus, the method comprising:
    acquiring static and dynamic analysis results corresponding to results obtained by performing static and dynamic analyses performed on a plurality of scripts, each classified as benign or malicious;
    converting the static and dynamic analysis results of each of the plurality of scripts into text formatted to match an output format of at least one Large Language Model (LLM);
    training the at least one LLM based on the converted text so that the at least one LLM infers static and dynamic analysis results from an input script; and
    predicting, by an inference module executing on the least one electronic apparatus, the static and dynamic analysis results for at least one target script based on the trained at least one LLM,
    wherein the acquiring of the static and dynamic analysis results includes:
    extracting first data including execution lines, variable values, and variable types by performing debugging on each of the plurality of scripts;
    extracting second data including execution lines and symbolic expressions for conditional statements by performing symbolic execution on each of the plurality of scripts; and
    extracting third data including execution lines, calling function names, and parameters of calling functions by performing function calling tracing on each of the plurality of scripts.

2. The method of claim 1, wherein the converting into text formatted to match the output of the at least one LLM classifies data extracted based on an execution order from the results of dynamic analysis corresponding to at least one of debugging, dynamic symbolic execution, or function calling tracing line by line.

3. The method of claim 1, wherein the training of the at least one LLM based on the converted text trains the at least one LLM to separately infer dynamic analysis results for each of a plurality of dynamic analysis items, including at least one of debugging, dynamic symbolic execution, and function calling tracing.

4. The method of claim 1, wherein the predicting of the static and dynamic analysis results divides a target script into a plurality of lines for input into the trained at least one LLM, identifies at least one line corresponding to a suspicious pattern among the plurality of lines based on the output of the trained at least one LLM, and predicts dynamic analysis results corresponding to at least one of debugging, dynamic symbolic execution, and function calling tracing for each of the plurality of lines based on the output of the trained at least one LLM.

5. The method of claim 1, further comprising: if a data size of scripts collected in real-time per unit time within a system linked to the electronic apparatus exceeds a threshold capacity matching a computational speed of a dynamic analysis module of the at least one electronic apparatus, dividing the scripts collected in real-time into a plurality of groups including a first group in which a data size of constituent scripts is less than or equal to a threshold capacity and a second group excluding the first group; and predicting dynamic analysis results for each script included in the second group based on the trained at least one LLM.

6. At least one non-transitory computer readable medium comprising instructions, which when executed by at least one processor performs the operation method of claim 1.

* * * * *